US012025236B2

(12) United States Patent
Fangauer et al.

(10) Patent No.: US 12,025,236 B2
(45) Date of Patent: Jul. 2, 2024

(54) ROTOR DEVICE, VALVE AND METHOD FOR ASSEMBLING A ROTOR DEVICE

(71) Applicant: ETO MAGNETIC GmbH, Stockach (DE)

(72) Inventors: Philipp Fangauer, Kornwestheim (DE); Peter Vincon, Stockach (DE)

(73) Assignee: ETO MAGNETIC GmbH, Stockach (DE)

( * ) Notice: Subject to any disclaimer, the term of this patent is extended or adjusted under 35 U.S.C. 154(b) by 441 days.

(21) Appl. No.: 17/289,925

(22) PCT Filed: Oct. 29, 2019

(86) PCT No.: PCT/EP2019/079510
§ 371 (c)(1),
(2) Date: Jul. 29, 2021

(87) PCT Pub. No.: WO2020/089217
PCT Pub. Date: May 7, 2020

(65) Prior Publication Data
US 2022/0003330 A1    Jan. 6, 2022

(30) Foreign Application Priority Data

Oct. 31, 2018    (DE) ..................... 10 2018 127 283.9

(51) Int. Cl.
*F16K 31/04*      (2006.01)
*F16K 27/02*      (2006.01)
(Continued)

(52) U.S. Cl.
CPC ............ *F16K 31/04* (2013.01); *F16K 27/029* (2013.01); *H02K 1/22* (2013.01); *H02K 5/128* (2013.01); *H02K 7/08* (2013.01); *F16K 31/047* (2013.01)

(58) Field of Classification Search
CPC ......... F16K 31/04; F16K 27/029; H02K 1/22; H02K 5/128; H02K 7/08
See application file for complete search history.

(56) References Cited

U.S. PATENT DOCUMENTS 3,516,136 A    6/1970 Carter et al.
4,948,091 A    8/1990 Satoh et al.
(Continued)

FOREIGN PATENT DOCUMENTS

CN    101512875 A    8/2009
DE    1900113        2/1970
(Continued)

OTHER PUBLICATIONS

German Search Report of Aug. 1, 2019 for the corresponding DE patent application No. 10 2018 127 283.9 (and English translation).
(Continued)

*Primary Examiner* — Eric Keasel
(74) *Attorney, Agent, or Firm* — Posz Law Group, PLC (57) ABSTRACT

A rotor device, in particular a stepper motor rotor device, with at least one hollow body, in particular a pressure pipe of a valve, and with at least one rotor assembly group that is fixated, in particular at least partially in a rotationally fixed and translationally fixed manner, in the hollow body, including at least one rotor element, which is at least configured to convert a magnetic field change into a rotational movement of the rotor element, further including a support element, which is at least configured for a rotational support of the rotor element, and including at least one fixation element, which is at least configured for a fixation of the rotor assembly group within the hollow body, in particular within the pressure pipe, wherein
the support element is arranged in the hollow body in such a way that axial forces pulling at least towards the rotor element and/or axial forces pulling and pressing the
(Continued)

support element along at least two opposing directions are transmittable via the support element.

21 Claims, 4 Drawing Sheets

(51) Int. Cl.
   *H02K 1/22* (2006.01)
   *H02K 5/128* (2006.01)
   *H02K 7/08* (2006.01)

(56) References Cited

U.S. PATENT DOCUMENTS

| | | | |
|---|---|---|---|
| 5,146,126 | A | 9/1992 | Hutchins |
| 7,316,384 | B2 | 1/2008 | Sekiya et al. |
| 2003/0178903 | A1 | 9/2003 | Rapp |
| 2005/0264113 | A1 | 12/2005 | Suzuki et al. |
| 2009/0273250 | A1 | 11/2009 | Huesges et al. |
| 2018/0258944 | A1 | 9/2018 | Diekmann et al. |

FOREIGN PATENT DOCUMENTS

| | | |
|---|---|---|
| DE | 690 10 349 T2 | 1/1995 |
| DE | 100 34 302 A1 | 2/2002 |
| DE | 10 2006 042 340 A1 | 3/2008 |
| DE | 10 2008 056 024 A1 | 5/2010 |
| DE | 10 2017 203 833 A1 | 9/2018 |
| EP | 3 383 353 A2 | 8/1990 |
| EP | 1 041 303 A1 | 10/2000 |
| EP | 1 601 084 A1 | 11/2005 |
| EP | 3 392 538 A1 | 10/2018 |
| WO | 2008/028711 A1 | 3/2008 |

OTHER PUBLICATIONS

International Search Report of the International Searching Authority mailed Jan. 31, 2020 for the corresponding International application No. PCT/EP2019/079510.

International Preliminary Report on Patentability issued on Apr. 27, 2021 for the corresponding international application No. PCT/EP2019/079510.

Norm DIN 7157, Jan. 1966, Passungsauswahl; Toleranzfelder, Abmaße, Paßtoleranzen. S. 1-5. DK 621.753.2 (100).

European Office Action mailed Jun. 9, 2023 in corresponding European Patent Application No. 19 798 020.4 (and English translation).

Chinese Office Action mailed Nov. 6, 2023 in corresponding Chinese Patent Application No. 201980087115.X (and English summary).

ROTOR DEVICE, VALVE AND METHOD FOR ASSEMBLING A ROTOR DEVICE

CROSS REFERENCE TO RELATED APPLICATIONS

This application is a U.S. national stage application of PCT/EP2019/079510 filed on Oct. 29, 2019, which is based on German Patent Application No. 10 2018 127 283.9 filed on Oct. 31, 2018, the contents of which are incorporated herein by reference.

STATE OF THE ART

The invention concerns a rotor device according to the preamble of claim 1, a valve according to claim 15 and a method for assembling a rotor device according to the preamble of claim 17.

A rotor device with at least one hollow body and with at least one rotor assembly group that is fixated in the hollow body has already been proposed, comprising at least one rotor element, which is at least configured to convert a magnetic field change into a rotational movement of the rotor element, further comprising a support element configured at least for a rotational support of the rotor element, and comprising at least one fixation element, which is at least configured for a fixation of the rotor assembly group within the hollow body. The rotor devices known from the state of the art are capable only of receiving pressing axial forces.

The objective of the invention is in particular to provide a generic device with advantageous support characteristics of a support of a rotor. The objective is achieved according to the invention by the features of patent claims 1, 15 and 17 while advantageous implementations and further developments of the invention may be gathered from the subclaims.

Advantages of the Invention

The invention is based on a rotor device, in particular a stepper motor rotor device, with at least one hollow body, in particular a pressure pipe of a valve, and with at least one rotor assembly group that is fixated, in particular in a rotationally fixed and translationally fixed manner, in the hollow body, comprising at least one rotor element, which is at least configured to convert a magnetic field change into a rotational movement of the rotor element, further comprising a support element, which is at least configured for a rotational support of the rotor element, and comprising at least one fixation element, which is at least configured for a fixation of the rotor assembly group within the hollow body, in particular within the pressure pipe.

It is proposed that the support element is arranged in the hollow body in such a way that axial forces pulling at least towards the rotor element and/or axial forces pulling and pressing the support element along at least two opposing directions are transmittable via the support element. In this way in particular advantageous support characteristics of the support of the rotor element are achievable. In particular, this advantageously enables a damage-free and/or at least substantially axially tolerance-free receiving and/or transmission of forces generated when a rotational movement of the rotor element is converted into an axial movement of a further element that is in an operative connection with the rotor element, for example by a spindle drive in a usage of the rotor device for switching a valve. By forces being received and/or transmitted "substantially damage-free" is in particular to be understood that pulling and/or pressing axial forces, which typically occur in a normal operation of the rotor device, reduce a nominal lifetime of the support element of the rotor device by maximally 25%, preferably by maximally 10% and preferentially by less than 1%, in particular when compared to an operation in which the support element is substantially free of pulling and/or pressing axial forces. By forces being received and/or transmitted "substantially tolerance-free" is in particular to be understood that maximally possible axial movements of the rotor element, caused by pulling and/or pressing axial forces typically occurring in the normal operation of the rotor device, amount to less than 0.3 mm, preferably less than 0.2 mm, advantageously less than 0.1 mm and preferentially less than 0.05 mm. Moreover, a transmittability of pulling axial forces, in particular pulling and pressing axial forces, advantageously allows developing a plurality of new application possibilities of the rotor assembly group, in which pulling axial forces may occur. Beyond this a high degree of operational safety and/or of reliability, in particular together with low downtime rates, is advantageously achievable.

By a "rotor device" is in particular a component of a motor and/or of an aggregate, preferably of an electric stepper motor, to be understood, which is configured to rotate and/or to generate a rotational movement of a part of the motor and/or of the aggregate, for example a rotor and/or a stator of the electric stepper motor. The electric stepper motor may in particular be implemented as a reluctance stepper motor, as a permanent magnet stepper motor or as a hybrid stepper motor. Preferentially the rotor device comprises rotor and stator of the motor and/or of the aggregate. The motor and/or the aggregate, preferably the electric stepper motor, is in particular configured for driving a stepper-motor driven valve. The motor and/or the aggregate, preferably the electric stepper motor, is in particular configured to implement an actor for an expansion valve and/or a shut-off valve within an air-conditioning cycle and/or cooling cycle, for example a $CO_2$ cooling cycle of a motor vehicle. By a "hollow body", in particular a pressure pipe, is in particular a component to be understood which separates an inner space, in particular a rotor space of an aggregate, preferably the electric stepper motor, from an environment, in particular from the stator space of the aggregate, preferably the electric stepper motor, in a pressure-tight manner. In particular, the interior of the hollow body, in particular the pressure pipe, is configured to be flowed through by a fluid, for example a gas and/or a liquid. In particular, in the normal operation of the rotor device, the gas and/or the liquid in the hollow body are/is subject to an overpressure significantly exceeding at least the value of 1 bar. Alternatively, the gas and/or the liquid in the hollow body may in the normal operation of the rotor device be subject to a negative pressure, which significantly goes below at least the value of 1 bar, or may be subject to the atmospheric pressure. In particular, the hollow body is realized in a tube shape with an at least substantially round cross section. In particular, the hollow body is implemented of a plastically deformable material, for example a metal like steel, copper or aluminum.

The rotor assembly group is in particular arranged at least partially, preferably completely, in an interior of the hollow body, preferably in a hollow space of the hollow body. By the rotor assembly group being "fixated in the hollow body at least partially in a rotationally fixed manner" is in particular to be understood that at least a portion of the rotor assembly group is in contact with the hollow body and/or connected to the hollow body in such a way that a rotation, in particular a non-destructive rotation, of the portion of the rotor assembly group relative to the hollow body is excluded, in particular with torques as can be expected in the normal operation. By the rotor assembly group being "fixated in the hollow body at least partially in a translationally fixed manner" is in particular to be understood that at least a portion of the rotor assembly group is in contact with the hollow body and/or connected to the hollow body in such a way that a displacement, in particular a non-destructive displacement, of the portion of the rotor assembly group relative to the hollow body is excluded, in particular with the axial forces to be expected in the normal operation. The rotor assembly group in particular comprises at least the rotor of the motor and/or of the aggregate, in particular of the electric stepper motor. The stator of the motor and/or of the aggregate, in particular of the electric stepper motor, is in particular implemented separately from the rotor assembly group. The stator of the motor and/or the aggregate, in particular of the electric stepper motor, is in particular arranged at least partially, preferably completely, outside the hollow body, in particular the pressure pipe. In particular, the rotor assembly group is implemented separately from an output shaft. In particular, the rotor assembly group has an output side. In particular, an output element, in particular an output shaft, is arrangeable on the output side of the rotor assembly group.

The rotor element is in particular realized as a component of the rotor of the motor and/or the aggregate, in particular of the electric stepper motor. The rotor element is in particular realized as a component of the rotor assembly group which is rotatable relative to the hollow body. In particular, the rotor element is implemented at least partly, preferably at least largely, of a soft-magnetic material, for example a soft iron. In particular, the rotor element forms a soft iron core. Alternatively or additionally the rotor element may be implemented at least partly, preferably at least largely, of a permanent magnet. "At least largely" is in particular to mean by at least 51%, preferably by at least 66%, advantageously by at least 75%, preferentially by at least 85% and especially preferentially by at least 95%. In particular, the rotor element has, in a circumferential direction that is perpendicular to a designated rotation axis of the rotor element, a toothed surface, wherein tooth distances between teeth of the tooth surface define step sizes of the stepper motor. In particular, the rotor element is configured to provide a precision of at least 50, preferably at least 100, preferentially at least 200 and particularly preferentially at least 350 steps per rotation. In particular, the rotor element has a rotor diameter of at least 5 mm, preferably of at least 8 mm, advantageously of at least 12 mm, preferentially of at least 15 mm and especially preferentially of maximally 20 mm. In particular, the rotor element is arranged concentrically in the hollow body. In particular, the rotation axis of the rotor element is oriented at least substantially parallel to a main extension direction of the hollow body. "Substantially parallel" is here in particular to mean an orientation of a direction relative to a reference direction, in particular in a plane, wherein the direction has a deviation from the reference direction that is in particular smaller than 8°, advantageously smaller than 5° and especially advantageously smaller than 2°. By the rotor element converting "a magnetic field change into a rotational movement" is in particular to be understood that the rotor element is configured to align itself, rotationally around the rotation axis, relative to a magnetic field that is applied from the outside, for example by the stator.

The support element is in particular configured to enable a rotational position change of the rotor element around the rotation axis and at the same time a fixation of the spatial position of the rotation axis relative to the hollow body. In particular, the support element is arranged in a proximity of a fixation point of the rotor assembly group, in which the rotor assembly group is fixated in the hollow body. In particular, the fixation point, in whose proximity the support element is arranged, is arranged on a side of the rotor assembly group that faces away from the output side of the rotor assembly group. By a "proximity" is in particular, in this context, a spatial region to be understood which is in particular implemented of points having in each case a minimum distance from a fixation point that is maximally 100 mm, advantageously maximally 50 mm, preferably no more than 30 mm and particularly preferably no more than 10 mm. A "fixation point" is in particular to mean a contact point between a portion of the rotor assembly group, in particular the fixation element of the rotor assembly group, and the hollow body, which realizes a fixation of the rotor assembly group in the hollow body. The fixation element is in particular configured to fixate at least a portion of the support element, in particular an outer ring of a ball bearing, relative to the hollow body in a rotationally fixed and/or translationally fixed manner. The fixation element is implemented separately from the support element. Alternatively it is conceivable that the fixation element is implemented integrally with the support element. "Integrally" is in particular to mean connected at least by substance-to-substance bond, for example by a welding process, a gluing process, an injection-molding process and/or another process deemed expedient by someone skilled in the art, and/or advantageously formed in one piece, like for example by a production from a cast and/or by a production in a one-component or multi-component injection-molding procedure, and advantageously of a single blank. The fixation element in particular comprises a bearing seat. The bearing seat is in particular configured for receiving the support element. The bearing seat is in particular configured for receiving the support element by a press fit. The bearing element is in particular configured to be pressed into the bearing seat of the fixation element via a press fit. The outer ring of the support element is in particular configured to be pressed into the bearing seat of the fixation element via a press fit. "Configured" is in particular to mean specifically programmed, designed and/or equipped. By an object being configured for a certain function is in particular to be understood that the object fulfills and/or executes said certain function in at least one application state and/or operation state.

By an "axial force" is in particular a force to be understood which acts in a direction that runs at least substantially parallel to the rotation axis of the rotor element. By an "axial force pulling towards the rotor element" is in particular an axial force to be understood whose force vector points in a direction away from the output side of the rotor assembly group. By "pulling axial forces being transmittable" is in particular to be understood that the support element is capable, while remaining intact and/or free of damages and/or maintaining its full functionality, of receiving pulling axial forces, which in particular attack at an inner ring of the support element, and of forwarding said pulling axial forces to the fixation element and/or to the hollow body, in particular via an outer ring of the support element, the transmittable and/or receivable axial forces being (in Newton) in particular at least greater than a 5-fold, preferably greater than a 10-fold, advantageously greater than a 15-fold, preferentially greater than a 20-fold and particularly preferentially greater than a 25-fold of a maximum diameter of the rotor element of the rotor assembly group in mm. In particular, the transmittable and/or receivable axial forces are at least greater than 150 N, preferably at least greater than 200 N and preferentially greater than 250 N.

Furthermore it is proposed that the rotor assembly group is, at least on the output side of the rotor assembly group, free of further support elements, in particular support elements implemented as ball bearings, as rotational slide bearings or as axial slide bearings, which are capable of transmitting axial forces. In this way an especially simple construction of the rotor assembly group is advantageously achievable, thus keeping costs at an advantageously low level. Moreover, a particularly small axial tolerance of the rotor is advantageously enabled, in particular in case of a change in direction between a movement of the rotor element generating a pulling axial force and a movement of the rotor element generating a pressing axial force, and/or in case of a change in direction of a rotation of the rotor element. It is in particular possible to keep the axial tolerance small as a superposition of two tolerances of two support elements via a tolerance chain is advantageously avoidable. This advantageously allows achieving a high precision and/or a precise regulatability of the device, in particular the valve, that is controlled by the aggregate and/or the motor, in particular by the stepper motor. In particular, the rotor assembly group is free of further counter-bearings configured to support the rotor element against pulling axial forces, wherein in particular a support of the output element, in particular the output shaft, on a side of the output element, in particular the output shaft, facing away from the rotor element is not to be regarded as such a counter-bearing.

It is moreover proposed that an, in particular minimum, radial distance from a rotation surface described by the rotor element in a 360-degree rotation, in particular around the rotation axis, to the hollow body is maximally 4.5%, preferably maximally 4%, preferentially maximally 3% and especially preferentially maximally 2% of the maximum diameter of the rotation surface and/or maximally 0.3 mm. In this way it is advantageously possible to obtain a large range of torques achievable by the rotor assembly group, in particular as a radial air gap between the rotor and an inner wall of the hollow body can be kept advantageously small.

It is further proposed that on at least one surface, which is in particular situated on an outer side in a radial direction, the fixation element has at least one deepening, which is configured to enable the, in particular rotationally fixed and translationally fixed, fixation of the rotor assembly group in the hollow body by means of an engagement at least of a portion of the hollow body into the deepening. This advantageously allows achieving a favorable fixation of the rotor assembly group in the hollow body. Moreover, a precise positioning of the rotor assembly group in the hollow body is advantageously achievable, in particular in comparison to a rotor assembly group pressed into the hollow space, for example by the deepening being brought to an overlap with a bulge and/or a marking of the hollow body, and/or if a position of the rotor assembly group in the hollow body can be first measured and then fixated. It is advantageously possible that the rotor assembly group is fitted-to-measure in the hollow body. The deepening is preferably realized as an elongate deepening. Alternatively the deepening may be realized as a point-like, circle-shaped and/or polygon-shaped deepening. In particular, the fixation element has at least one further deepening. This advantageously enables a simplified positioning and/or a fixation against slipping. In particular, the deepenings are arranged at regular or irregular distances in a circumferential direction around the fixation element. In particular, the engagement of the portion of the hollow body into the deepening is generated by a plastic deformation of the hollow body, for example a bending, a caulking and/or a crimping. In particular, the deepening is configured to create a form-fit connection with the hollow body, which in particular fixates the rotor assembly group, preferably at least the fixation element, in the interior of the hollow body in a rotationally fixed and/or translationally fixed manner. The form-fit connection between the hollow body and the rotor assembly group, in particular the fixation element, is in particular configured to support axial forces acting onto the rotor assembly group, in particular the support element, and/or to discharge and/or to transmit said axial forces to the hollow body. It is in this way advantageously achievable that the tolerance of the rotor assembly group is defined only by the tolerance of the support element. The deepening in the fixation element is in particular arranged in a region of the fixation element that is free of overlap with a region of the bearing seat of the fixation element. The deepening in the fixation element is in particular arranged, in a direction of the designated rotation axis of the rotor element and/or of the support element, above the bearing seat. Alternatively the fixation element could be implemented free of a deepening, and the fixation element could be connected with the hollow body by welding, in particular laser welding, and/or by gluing.

Beyond this it is proposed that the deepening in the fixation element is formed as a groove. In this way an optimum alignment of the rotor assembly group in the hollow body is advantageously achievable. In particular, an oblique positioning of the rotor assembly group in the hollow body is advantageously avoidable. It is furthermore advantageously possible to implement a precise positioning of an initial rotational orientation of the rotor assembly in the hollow body. In particular, the groove is formed as a gouge and/or as a crimp.

It is also proposed that the fixation element, in particular the rotor assembly group with the fixation element, is introduced in the hollow body via a transition fit, in particular a slight interference fit or a close tolerance fit. In this way a damaging of the support element during an introduction of the rotor assembly group, in particular the fixation element, into the hollow body is advantageously achievable, in particular as the forces acting on the support element during assembly can be kept at an advantageously low level. Moreover, it is advantageously possible to achieve a particularly precise positioning of the rotor assembly group, in particular of the fixation element, in the hollow body, which advantageously also permits a simple subsequent correction if during assembly the rotor assembly group, in particular the fixation element, was inserted in the hollow body inaccurately, for example too deeply. An "interference fit" is in particular to mean a fitting of the outer shape of the fixation element and the inner shape of the hollow body relative to each other, which permits an introduction of the fixation element in the hollow body with a maximally required press-in force (in Newton) of less than a 25-fold, preferably less than a 20-fold, advantageously less than a 15-fold, preferentially less than a 10-fold and especially preferentially less than a 5-fold of the maximum diameter of the rotor element of the rotor assembly group in mm. In particular, the press-in force maximally required for an introduction of the fixation element into the hollow body via the transition fit is smaller than 150 N, preferably smaller than 200 N and preferentially smaller than 250 N. Preferably the press-in force maximally required for an introduction of the fixation element into the hollow body via the transition fit is smaller than the pulling and/or pressing axial force which is maximally to be expected in the normal operation of the rotor device and which acts onto the support element. The transition fit in particular forms an H7j6 fit according to DIN 7157:1966-01, preferably an H7h6 fit according to DIN 7157:1966-01, preferentially an H7g6 fit according to DIN 7157:1966-01 and particularly preferentially an H7f7 fit according to DIN 7157:1966-01.

If the support element is implemented as a ball bearing, in particular a groove ball bearing, a two-row oblique-ball bearing and/or a four-point bearing, as a two-row tapered roller bearing and/or as a rotational slide bearing, in particular a rotational slide bearing with a securing ring for an axial fixation at least of the inner ring of the rotational slide bearing with the rotor element, advantageously a transmission and/or a receiving is enabled at least of axial forces pulling towards the rotor element. Advantageously the support element implemented in such a way is capable of receiving and/or transmitting axial forces in both axial directions. The securing ring is in particular embodied as a Seeger ring. Utilization of ball bearings and/or tapered roller bearings advantageously allows a rotation with a particularly low friction.

In addition it is proposed that the support element comprises an outer ring and an inner ring, the inner ring being at least configured for receiving axial forces from the rotor element and the outer ring being at least configured for transmitting the axial forces received by the inner ring to the fixation element and/or to the hollow body. In this way it is in particular possible to provide advantageous support characteristics for the support of the rotor element. The outer ring and the inner ring are preferably arranged concentrically to each other. The outer ring in particular completely encompasses the inner ring in a circumferential direction. The outer ring is in particular configured, during assembly of the rotor device, to be pressed into the bearing seat of the fixation element, preferably by means of an interference fit. In an assembled state of the rotor assembly group, the outer ring is in particular pressed into the bearing seat of the fixation element, preferably via an interference fit. The outer ring is in particular configured for receiving from the inner ring forces which act onto the inner ring and which are transmitted, for example, via the balls of the ball bearing or via the cones of the tapered roller bearing. The outer ring is in particular configured to support the forces transmitted by the inner ring on the fixation element and/or on the hollow body. The inner ring is in particular configured, during assembly of the rotor device with the rotor element, to be pressed, preferably via an interference fit. In the assembled state of the rotor assembly group at least a portion of the rotor element is pressed into the inner ring, in particular into a central recess of the inner ring, preferably via an interference fit.

If the support element and the rotor element and/or the support element and the fixation element are non-destructively inseparably connected with one another, in particular pressed with one another via an interference fit, in particular a rotor assembly group with advantageous support characteristics is achievable, which is in particular capable of receiving pulling and pressing axial forces. By components being "non-destructively inseparably connected with one another" is in particular to be understood that the components are connected with one another in such a way that a separation of the components would result in at least partial destruction of at least one component of the previously connected components. In particular, the outer ring of the support element is non-destructively inseparably connected with the fixation element and/or with the hollow body, and at the same time the inner ring of the support element is non-destructively inseparably connected with the rotor element. By an "interference fit" is in particular a fitting to be understood in which a maximum dimension of a recess of a first component is smaller than a maximum dimension of a connection part of a second component in a non-pressed state wherein, for a connection of the first component and the second component, the connection part of the second component is pressed into the recess of the first component.

Furthermore, it is proposed that the support element is arranged on a side of the rotor element that faces away from an output, in particular an output shaft, of the rotor assembly group. In this way in particular a rotor assembly group with advantageous support characteristics is achievable. Advantageously this allows obtaining a favorable true-running of the rotor element. In particular, the rotor assembly group is free of further support elements arranged in a proximity of the side of the rotor element that faces towards the output. By a "proximity" is in particular, in this context, a spatial region to be understood which is in particular implemented of points having in each case a minimum distance from the rotor element that is maximally 50 mm, advantageously maximally 30 mm, preferably no more than 20 mm and particularly preferably no more than 10 mm.

If the support element comprises an outer ring, which is implemented integrally with the fixation element, an especially simple construction of the rotor device is advantageously achievable, as a result of which it is in particular possible to keep production costs at a low level.

It is moreover proposed that the fixation element is embodied as a bearing carrier. In this way a particularly advantageous construction of the rotor assembly group may be enabled. It is further advantageously possible for an assembly of the rotor assembly group to be carried out outside the hollow body, allowing the ready-assembled rotor assembly group to be fixated in the hollow body by means of the fixation element in a simple manner. This also advantageously enables an especially precise mounting of the rotor assembly group in the hollow body. A "bearing carrier" is in particular configured to carry at least one support element, preferably to hold at least one support element in a rotationally fixed and/or translationally fixed manner.

Beyond this it is proposed that the bearing carrier comprises a continuous recess in a direction extending parallel to an axial direction of the rotor element. This advantageously enables a damage-free pressing-in of the rotor element into the support element, in particular into the central recess of the inner ring of the support element. Advantageously an easy and secure mounting of the rotor assembly group is enabled. In a mounting state of the rotor assembly group in which the outer ring of the support element is already fixedly connected with the bearing carrier, the recess of the bearing carrier in particular facilitates a support of the inner ring of the support element during a pressing-in of the rotor element into the support element. By a "continuous recess" of a component is in particular a recess to be understood which completely penetrates the component, for example a hole. In particular, a diameter of the continuous recess of the bearing carrier is smaller, in particular smaller by at least 10%, than an outer diameter of the outer ring of the support element. In this way advantageously a support of the outer ring of the support element on the bearing carrier in the axial direction is enabled. In particular, a diameter of the continuous recess of the bearing carrier is greater, in particular greater by at least 10%, than an inner diameter of the inner ring of the support element. This advantageously enables an introduction of a support device for a support of the inner ring of the support element during a pressing-in of the rotor element into the support element, as a result of which a damaging of the support element by the pressing-in forces which occur in the pressing-in via the interference fit, is advantageously avoidable.

It is also proposed that in at least one end region of the hollow body, in particular in a proximity of the support element, the hollow body is implemented so as to be calotte-shaped, in particular spherical-calotte-shaped, and/or that at least the end region of the hollow body is produced via deep drawing. As a result, considering the pressure loads occurring in the hollow body, a wall thickness of the hollow body can be kept advantageously small, in particular as the calotte shape, in particular the spherical calotte shape, has an advantageously high degree of pressure resistance. This advantageously allows augmenting a formability of the hollow body and/or simplifying a forming of the hollow body. In particular, in this way the fixation of the rotor assembly group in the hollow body by the plastic deformation of the hollow body, respectively by caulking, may advantageously be facilitated. Moreover, a thin wall of the hollow body separating the stator and the rotor of the motor, in particular the stepper motor, advantageously permits a particularly favorable magnetic interaction between the stator and the rotor, thus advantageously making a high maximally reachable torque of the rotor, in particular of the rotor element, achievable. By a "proximity" is in particular, in this context, a spatial region to be understood which is implemented of points having in each case a minimum distance from the support element that is in particular maximally 50 mm, advantageously maximally 30 mm, preferably no more than 20 mm and particularly preferably no more than 10 mm. In particular, the hollow body is closed, in particular pressure-tightly closed, in the end region of the hollow body. "Calotte-shaped" is in particular to mean cupola-shaped, spherical-segment-shaped, and/or dome-shaped. "Deep drawing" is in particular to mean a pull-and-pressure forming of a metal, in particular a metal sheet. In particular, the wall thickness of the hollow body is constant. Preferably, in the region of the calotte shape, in particular the spherical-calotte shape, the wall thickness of the hollow body is at least substantially identical to the wall thickness of the hollow body outside the calotte shape, in particular the spherical-calotte shape. "Substantially identical" is in particular to mean identical except for manufacturing tolerances. In particular, a material, for example a metal sheet, maintains a constant wall thickness in the deep drawing. This advantageously allows avoiding weak points occurring in the hollow body.

Furthermore a valve with the rotor device is proposed. The rotor device serves for an electromagnetic controlling of the valve, in particular of an opening state and/or an opening degree of the valve. The valve is in particular implemented as a slide valve, for example a piston valve or a spherical valve, or preferably as a seat valve, for example a disk valve, a spherical valve, or preferentially a needle valve. In particular, the rotor element is configured for driving at least one spindle drive. In particular, the spindle drive is arranged on the output side of the rotor element. In particular, the spindle drive is configured to convert the rotational movement of the motor, in particular the stepper motor, into a translational movement of an, in particular rotationally supported, valve blocking body, for example a valve needle. As a result, it is advantageously possible to realize a valve which is capable of receiving pulling (and pressing) axial forces caused, for example, at least partly by the spindle drive, and which at the same time has a particularly small axial tolerance, in particular also in case of a change in the rotation direction of the rotor element, thus enabling a particularly precise regulation and/or adjustment of the valve.

It is further proposed that the valve comprises a stator, which is pressure-tightly and/or fluid-tightly separated from the rotor assembly group that can be flowed around by a fluid and that at least partially implements a rotor interacting with the stator. In this way, advantageously a valve switching is enabled within a closed-off fluid-conducting hollow body, wherein the valve is preferably free of electric lines arranged within the fluid-conducting hollow body.

Beyond this a method is proposed for assembling a rotor device and/or for assembling a valve, with at least one hollow body, in particular a pressure pipe of a valve, and with at least one rotor assembly group that is fixated, in particular in a rotationally fixed and translationally fixed manner, in the hollow body, comprising at least one rotor element, which is at least configured to convert a magnetic field change into a rotational movement of the rotor element, further comprising a support element, which is at least configured for a rotational support of the rotor element, and comprising at least one fixation element, which is at least configured for a fixation of the rotor assembly group within the hollow body, in particular within the pressure pipe, wherein in at least one assembly step the rotor element and the fixation element are fixedly pressed with the support element, in particular by an interference fit, outside the hollow body, in particular the pressure pipe, wherein the support element is in particular configured for a transmission of pulling, preferably pulling and pressing, axial forces. In this way a simple assembly of the rotor assembly group, the rotor device and/or the valve is advantageously enabled. In particular, this advantageously facilitates an especially precise positioning of the rotor assembly group in the hollow body. The term "outside the hollow body" is in particular to mean outside the interior of the hollow body. In particular, the pressing of the support element and the fixation element via the interference fit results in a non-destructively inseparable connection of the support element with the fixation element. By a "fixed pressing" is in particular a pressing via interference fit to be understood and/or a pressing that results in a non-destructively inseparable connection.

It is further proposed that in at least one further assembly step, which is in particular executed temporally after the assembly step, the rotor assembly group is fitted and/or inserted into the hollow body with a transition fit, in particular with a slight interference fit or with a close tolerance fit. In this way a damage-free mounting of the rotor assembly group in the hollow body is advantageously enabled. In particular, a load on the support element can be kept advantageously small during an execution of the further assembly step, as a result of which a full functionality of the support element is advantageously maintainable.

Moreover it is proposed that in at least one additional further assembly step the rotor assembly group is fixated in the hollow body at least by a forming process acting at least onto a portion of the hollow body, in particular by caulking and/or by crimping. In this way a secure and stable, in particular rotationally fixed and translationally fixed, fixation of the rotor assembly group in the hollow body is advantageously facilitated, which does not lead to a damaging of the support element. Advantageously a mounting of the rotor assembly group in the hollow body is enabled, which is at least substantially free of axial forces caused by the mounting and having a negative effect on the support element. In particular, the forming process comprises a plastic deformation, in particular a bending, of a portion of the hollow body, preferably of a wall of the hollow body. In particular, the hollow body is plastically deformed in such a way that the wall of the hollow body at least partly engages into the deepening or the deepenings of the fixation element.

In addition it is proposed that the rotor assembly group is fixated in the hollow body at least via welding, in particular laser welding. This advantageously enables a secure and stable, in particular rotationally fixed and translationally fixed, fixation of the rotor assembly group in the hollow body, which does not lead to a damaging of the support element. Advantageously a mounting of the rotor assembly group in the hollow body may be facilitated which is at least substantially free of axial forces caused by the mounting and having a negative effect onto the support element. In particular, in the welding the hollow body is melted at least partly with the fixation element and/or with the support element.

In complementation it is proposed that the rotor assembly group is fixated in the hollow body at least by gluing. In this way a secure and stable, in particular rotationally fixed and translationally fixed, fixation of the rotor assembly group in the hollow body will be enabled, which does not lead to a damaging of the support element. Advantageously a mounting of the rotor assembly group in the hollow body is advantageously facilitated, which is at least substantially free of axial forces caused by the mounting and having a negative effect onto the support element. In particular, with gluing a gluing agent is introduced between an inner wall of the hollow body and an outer wall of the fixation element and/or of the support element.

Furthermore it is proposed that the axial forces, which during a fitting-in, during an insertion and/or during a fixation of the fixation element in the hollow body act onto the support element in a direction that is parallel to a rotation axis of the rotor element, are smaller than maximum axial forces which are to be expected in a normal operation of the rotor device and/or of the valve, in particular smaller (in Newton) than a 25-fold, preferably smaller than a 20-fold, advantageously smaller than a 15-fold, preferentially smaller than a 10-fold and especially preferentially smaller than a 5-fold of the maximum diameter of the rotor element of the rotor assembly group in mm; preferably smaller than 150 N, preferentially smaller than 250 N. This advantageously allows a fixation of the rotor assembly group in the hollow body which does not lead to a damaging of the support element.

The rotor device according to the invention, the valve according to the invention and the method according to the invention are herein not to be limited to the application and implementation described above. In particular, in order to fulfill a functionality that is described here, the rotor device according to the invention, the valve according to the invention and the method according to the invention may comprise a number of individual elements, components and units that differs from a number given here.

DRAWINGS

Further advantages will become apparent from the following description of the drawings. In the drawings three exemplary embodiments of the invention are shown. The drawings, the description and the claims contain a plurality of features in combination. Someone skilled in the art will purposefully also consider the features individually and will find further expedient combinations.

It is shown in.

DESCRIPTION OF THE EXEMPLARY EMBODIMENTS

Figure 1:
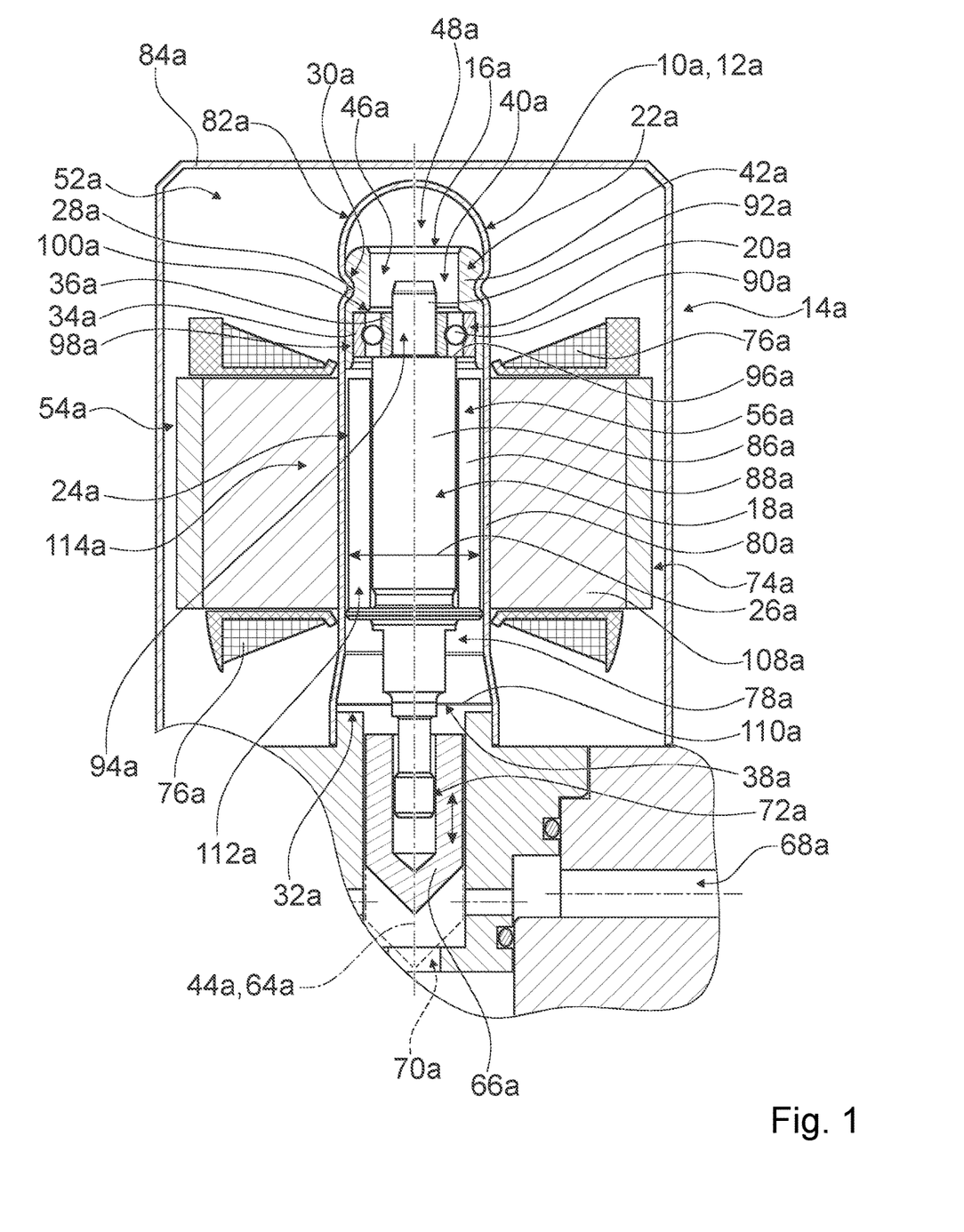
FIG. 1 a schematic sectional view of a valve with a rotor device.

FIG. 1 shows a valve 14a. The valve 14a is implemented as an electromagnetically controlled valve. The valve 14a comprises a valve blocking body 66a. The valve blocking body 66a is configured to at least partially or completely close and/or release a fluid duct 68a of a pressure pipe 12a of the valve 14a. The valve blocking body 66a is translationally movable. The valve blocking body 66a can be translationally moved towards a valve seat 70a of the valve 14a and/or can be translationally moved away from the valve seat 70a of the valve 14a. If the valve blocking body 66a is situated in the valve seat 70a, the fluid duct 68a is completely closed. If the valve blocking body 66a is situated outside the valve seat 70a, the fluid duct 68a is at least partially open. The valve 14a comprises a rotor device 52a. The rotor device 52a is configured for a controlling of the valve 14a. The rotor device 52a comprises a spindle drive 72a. The spindle drive 72a is configured to translationally move the valve blocking body 66a. The valve blocking body 66a is rotationally supported via a support element, which is not shown in detail.

The valve 14a comprises an electromagnetic stepper motor 74a. The electromagnetic stepper motor 74a comprises a stator 54a. The stator 54a comprises at least one coil winding 76a. Preferentially the stator 54a comprises a plurality of coil windings 76a. The coil winding 76a is configured to generate a magnetic field. The coil winding 76a forms the stator winding of the stator 54a. The electromagnetic stepper motor 74a comprises a rotor 56a. The rotor 56a is configured to interact with the stator 54a. The rotor 56a is configured to interact with the magnetic field generated by the coil winding 76a. A modulation of the magnetic field of the stator 54a is configured to generate a rotation of the rotor 56a. The stator 54a is realized as a laminated stator. The stator 54a comprises at least one magnet core 108a. For each coil winding 76a there is an allocated magnet core 108a. The magnet core 108 is implemented of a laminated steel. The valve 14a comprises a housing 84a. The housing 84a is configured at least for holding and/or for protecting at least a portion of the valve 14a and/or of the rotor device 52a.

The stator 54a is separated from the rotor 56a in a pressure-tight and/or fluid-tight manner. The rotor device 52a comprises a hollow body 10a. The hollow body 10a is implemented as a pressure pipe 12a. The hollow body 10a implements the pressure-tight and/or fluid-tight separation of the stator 54a and the rotor 56a. The hollow body 10a has an interior 78a. The hollow body 10a, in particular the interior 78a of the hollow body 10a, can be flowed through by a fluid. Components within the hollow body 10a are flowed around by the fluid. Components outside the hollow body 10a are free of contact with the fluid. The fluid in the interior 78a of the hollow body 10a is subject to a pressure.

The hollow body 10a is delimited by walls 80a. The fluid in the interior 78a of the hollow body 10a exerts a pressure of more than 1 bar onto the walls 80a of the hollow body 10a. The hollow body 10a, in particular the walls 80a of the hollow body 10a, is/are implemented of a metal. Alternatively, the hollow body 10a may also be produced from a synthetic material. The wall 80a of the hollow body 10a has a constant wall thickness. The rotor 56a is arranged in a rotor space 112a. The rotor space 112a is formed by the interior 78a of the hollow body 10a. The stator 54a is arranged in a stator space 114a. The stator space 114a is arranged outside the interior 78a of the hollow body 10a. The stator space 114a and the rotor space 112a are separated from each other in a pressure-tight and/or fluid-tight manner.

The hollow body 10a comprises at least one end region 48a. In an assembled state of the rotor device 52a, the end region 48a of the hollow body 10a is arranged in a proximity of a support element 20a of the rotor device 52a. In the end region 48a the hollow body 10a is implemented so as to be calotte-shaped. In the end region 48a the hollow body 10a is implemented so as to be spherical-calotte-shaped. The end region 48a of the hollow body 10a has a calotte shape 82a. The end region 48a of the hollow body 10a is produced via deep drawing. The calotte shape 82a of the hollow body 10a is produced via deep drawing. Due to the calotte shape 82a, the end region 48a of the hollow body 10a has a particularly high degree of pressure resistance.

The rotor device 52a comprises a rotor assembly group 16a. The rotor assembly group 16a is arranged within the hollow body 10a. In the region of the rotor assembly group 16a the hollow body 10a has an at least substantially constant diameter and/or an at least substantially constant cross section geometry. The rotor assembly group 16a is fixated with the hollow body 10a in an at least partly rotationally fixed and translationally fixed manner. The rotor assembly group 16a can be flowed around by the fluid. The rotor assembly group 16a at least partly forms the rotor 56a. The rotor assembly group 16a has a rotation axis 64a. At least a portion of the rotor assembly group 16a is configured to rotate around the rotation axis 64a.

The rotor assembly group 16a comprises an output 38a. The output 38a is operatively connected with the spindle drive 72a. The output 38a is implemented at least partly integrally with the spindle drive 72a. The output 38a is arranged on an output side 32a of the rotor assembly group 16a.

The rotor assembly group 16a comprises a rotor element 18a. The rotor element 18a is at least configured to convert a magnetic field change created by the stator 54a into a rotational movement of the rotor element 18a. The rotor element 18a comprises a rotor shaft 86a. The rotor shaft 86a is configured to rotate around the rotation axis 64a. The rotation axis 64a runs centrally through the rotor shaft 86a in a longitudinal direction. The rotor shaft 86a is implemented so as to be rotationally symmetrical around the rotation axis 64a. The rotor element 18a comprises at least one permanent magnet 88a. The permanent magnet 88a at least partially forms an armature of the electromagnetic stepper motor 74a. The permanent magnet 88a is configured for an interaction with the magnetic field of the stator 54a. The permanent magnet 88a is implemented integrally with the rotor shaft 86a. The permanent magnet 88a is glued to the rotor shaft 86a. A plurality of permanent magnets 88a are glued to the rotor shaft 86a in a circumferential direction of the rotor shaft 86a. The rotor element 18a can be flowed through and/or flowed around by the fluid. During a rotation around the rotation axis 64a, the rotor element 18a describes a rotation surface within the hollow body 10a. A radial distance 24a between the rotation surface described by the rotor element 18a in a rotation by at least 360° and the hollow body 10a is maximally 4.5% of a maximum diameter 26a of the rotation surface and/or maximally 0.3 mm. For an optimization of a magnetic coupling of the rotor 56a and the stator 54a, a distance between the rotor 56a and the stator 54a is kept as small as possible by a dimensioning of the rotor element 18a and by a wall 80a that is as thin as possible. The hollow body 10a comprises a reference marking 110a. The reference marking 110a is realized as a bending of the wall 80a of the hollow body 10a. Alternatively the reference marking 110a could be realized as a color mark or as an engraved mark. The reference marking 110a is configured for an adjustment-to-measure of a position of the rotor assembly group 16a in the hollow body 10a.

The rotor assembly group 16a comprises a support element 20a. The support element 20a is configured for a rotational support of the rotor element 18a. The support element 20a is configured for a rotational support of the rotor shaft 86a of the rotor element 18a. The support element 20a can be flowed around and/or flowed through by the fluid. The support element 20a is arranged in the hollow body 10a in such a way that axial forces, which pull at least towards the rotor element 18a, are transmittable via the support element 20a. The support element 20a is arranged in the hollow body 10a in such a way that it is configured for transmitting axial forces pulling and pressing on the support element 20a along at least two opposed directions. The support element 20a is embodied as a ball bearing. The support element 20a comprises an outer ring 34a. The support element 20a comprises an inner ring 36a. Between the outer ring 34a and the inner ring 36a the support element 20a comprises a plurality of balls 90a. The outer ring 34a is at least configured to discharge the axial forces received by the inner ring 36a to a fixation element 22a of the rotor assembly group 16a and/or to the hollow body 10a.

The support element 20a is arranged on a side 40a of the rotor element 18a which faces away from the output 38a of the rotor assembly group 16a. The rotor assembly group 16a is at least on the output side 32a of the rotor assembly group 16a free of further support elements capable of transmitting axial forces. The rotor assembly group 16a is at least in a proximity of the rotor element 18a free of further support elements capable of transmitting axial forces. The support element 20a and the rotor element 18a are non-destructively inseparably connected to each other. The rotor element 18a comprises a connection nipple 92a. The connection nipple 92a is implemented so as to be rotationally symmetrical around the rotation axis 64a of the rotor shaft 86a. The connection nipple 92a is arranged on the side 40a of the rotor element 18a, in particular of the rotor shaft 86a, that faces away from the output 38a. The connection nipple 92a is configured to be pressed into a recess 94a of the inner ring 36a via an interference fit. The connection nipple 92a is pressed-in in the recess 94a of the inner ring 36a. The rotor shaft 86a comprises an abutment edge 96a. The connection nipple 92a is pressed-in in the recess 94a of the inner ring 36a such that the abutment edge 96a of the rotor shaft 86a directly abuts on the inner ring 36a.

The rotor assembly group 16a comprises the fixation element 22a. The fixation element 22a is at least configured to fixate the rotor assembly group 16a within the hollow body 10a. The fixation element 22a is configured for a rotationally fixed and translationally fixed fixation of the rotor assembly group 16a in the interior 78a of the hollow body 10a. The fixation element 22a is inserted into the hollow body 10a via a transition fit. The fixation element 22a is fixated in the hollow body 10a via a caulking of the wall 80a of the hollow body 10a. The fixation element 22a comprises at least one deepening 30a on an in a radial direction of the fixation element 22a outer surface 28a. The deepening 30a of the fixation element 22a is configured to enable the rotationally fixed and translationally fixed fixation of the rotor assembly group 16a in the hollow body 10a by an engagement at least of a portion of the wall 80a of the hollow body 10a into the deepening 30a of the fixation element 22a. The wall 80a of the hollow body 10a engages into the deepening 30a of the fixation element 22a in a form-fit manner. The hollow body 10a and the fixation element 22a are connected to each other in a rotationally fixed and translationally fixed manner via a form-fit connection. The rotor assembly group 16a is fixated in the hollow body 10a in a proximity of the end region 48a of the hollow body 10a, in particular via the form-fit connection between the wall 80a and the deepening 30a. By a "proximity" is in particular, in this context, a spatial region to be understood within which the rotor assembly group 16a is connected with the hollow body 10a in a fixating manner and which is in particular implemented of points having in each case a minimum distance to the end region 48a of the hollow body 10a that is maximally 50 mm, advantageously maximally 30 mm, preferably no more than 20 mm and particularly preferably no more than 10 mm. The deepening 30a in the fixation element 22a shown in FIG. 1 is realized as a groove. The groove runs in a circumferential direction around at least a large portion of the circumference of the fixation element 22a, preferably around a complete circumference of the fixation element 22a. Alternatively the deepening 30a may be section-wise interrupted or may be implemented as a plurality of point-shaped deepenings, or the like.

The support element 20a and the fixation element 22a are non-destructively inseparably connected to each other. The fixation element 22a comprises a bearing seat 98a. The support element 20a is arranged in the bearing seat 98a. The support element 20a is pressed-in in the bearing seat 98a via an interference fit. The outer ring 34a of the support element 20a is pressed-in in the bearing seat 98a via an interference fit. The fixation element 22a has a shoulder 100a. The shoulder 100a is configured to form an abutment for the outer ring 34a of the support element 20a, which is inserted in the fixation element 22a. The support element 20a is pressed-in in the bearing seat 98a of the fixation element 22a such that the shoulder 100a of the fixation element 22a abuts on the outer ring 34a. The fixation element 22a is implemented as a bearing carrier 42a. The bearing carrier 42a comprises, in a direction extending parallel to an axial direction 44a of the rotor element 18a, a continuous recess 46a. In an assembled state of the rotor device 52a, the axial direction 44a of the rotor element 18a extends at least substantially parallel to the rotation axis 64a of the rotor element 18a. The continuous recess 46a of the fixation element 22a is implemented substantially in a cylindrical shape. Alternatively the continuous recess 46a of the fixation element 22a could be implemented in a polyhedric shape, for example in a cubic shape. The continuous recess 46a of the fixation element 22a has a diameter that is smaller than a diameter of the outer ring 34a and greater than a diameter of the inner ring 36a. The continuous recess 46a of the fixation element 22a is configured to permit a pressing-in of the rotor element 18a into the support element 20a, which is non-damaging for the support element 20a, in particular in an assembly state of the rotor assembly group 16a in which the fixation element 22a has already been pressed with the support element 20a. The continuous recess 46a of the fixation element 22a permits a fixation-element-side access to the inner ring 36a of the support element 20a.

Figure 2:
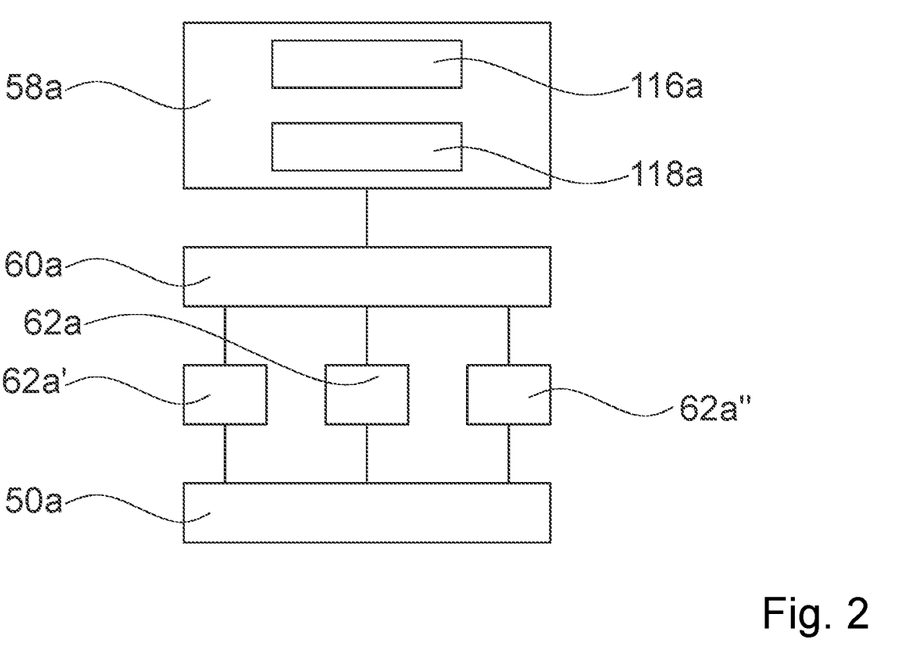
FIG. 2 a flow chart of a method for an assembly of the rotor device.

FIG. 2 shows a flow chart of a method for assembling the rotor device 52a. In at least one assembly step 58a the rotor element 18a and the fixation element 22a are fixedly pressed with the support element 20a outside the hollow body 10a. In a first substep 116a of the assembly step 58a, firstly the outer ring 34a of the support element 20a is pressed into the bearing seat 98a of the fixation element 22a. The outer ring 34a of the support element 20a is in the first substep 116a pressed into the bearing seat 98a via an interference fit. For the purpose of avoiding a damaging of the support element 20a, in the first substep 116a, in the pressing-in of the support element 20a into the fixation element 22a, the outer ring 34a of the support element 20a is supported in a direction that is opposed to a press-in direction of the support element 20a. In a second substep 118a of the assembly step 58a, the rotor element 18a is pressed into the support element 20a. The connection nipple 92a of the rotor element 18a is in the second substep 118a pressed into the recess 94a of the inner ring 36a of the support element 20a via an interference fit. For the purpose of avoiding a damaging of the support element 20a, in the second substep 118a, in the pressing-in of the connection nipple 92a of the rotor element 18a in the recess 94a of the inner ring 36a of the support element 20a, the inner ring 36a of the support element 20a is supported in a direction opposed to a press-in direction of the rotor element 18a.

In at least one further assembly step 60a the rotor assembly group 16a is fitted and/or inserted into the hollow body 10a via a transition fit. The maximum axial forces which, during the further assembly step 60a, in the fitting and/or insertion of the fixation element 22a into the hollow body 10a, act onto the support element 20a in a direction that is parallel to the rotation axis 64a of the rotor element 18a, are smaller than maximum axial forces which are to be expected in a normal operation of the rotor device 52a and/or of the valve 14a. In at least one additional further assembly step 62a, the rotor assembly group 16a is fixated in the hollow body 10a at least by a forming process that acts at least onto a portion of the hollow body 10a. The forming process comprises a bending and/or caulking of the wall 80a of the hollow body 10a. In the forming process the wall 80a of the hollow body 10a is brought to a form-fit connection with the fixation element 22a. In the forming process the wall 80a of the hollow body 10a is pressed into the deepening 30a of the fixation element 22a.

Alternatively or additionally the rotor assembly group 16a is fixated via welding in an alternative additional further assembly step 62a'. The welding comprises a laser welding. Alternatively or additionally the rotor assembly group 16a is fixated in the hollow body 10a at least via gluing in a second alternative additional further assembly step 62a". In at least one further assembly step 50a the hollow body 10a with the rotor assembly group 16a in its interior 78a is closed in a pressure-tight and/or fluid-tight manner.

Figure 3:
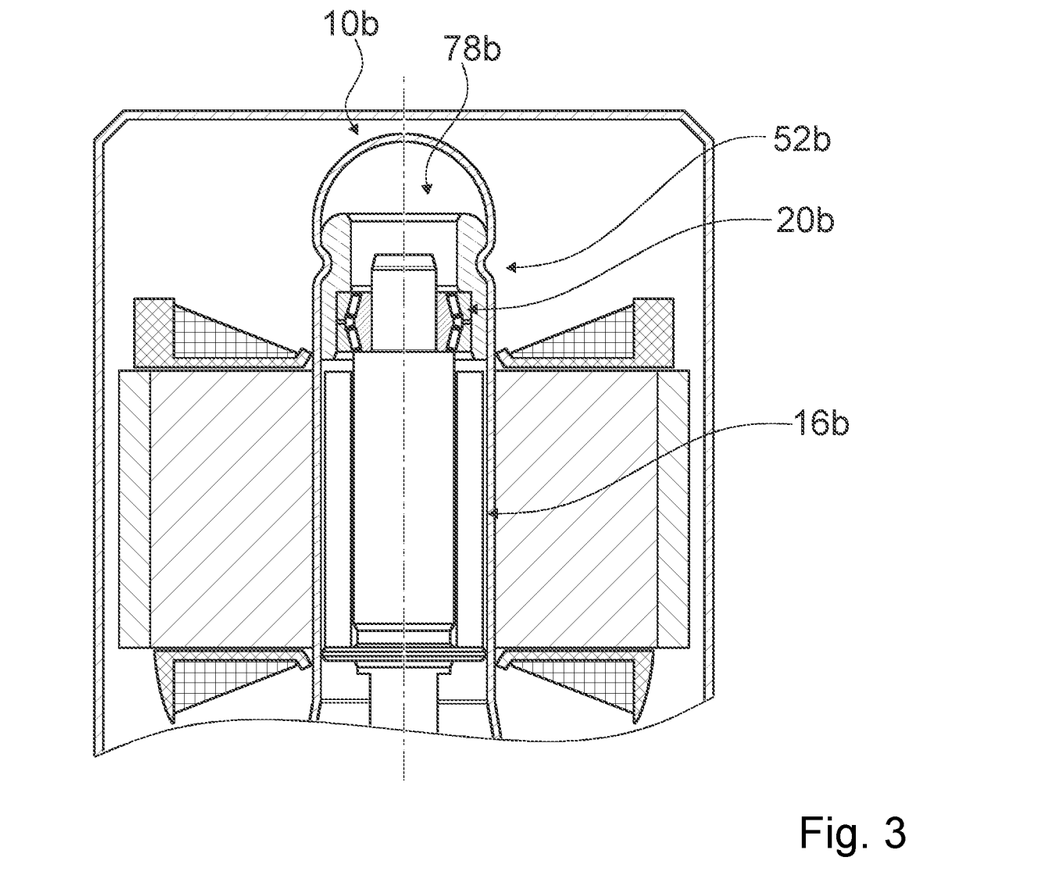
FIG. 3 a schematic sectional view of an alternative rotor device with an alternative support element, and FIG. 4 a schematic sectional view of a further alternative rotor device with a further alternative support element.
Figure 4:
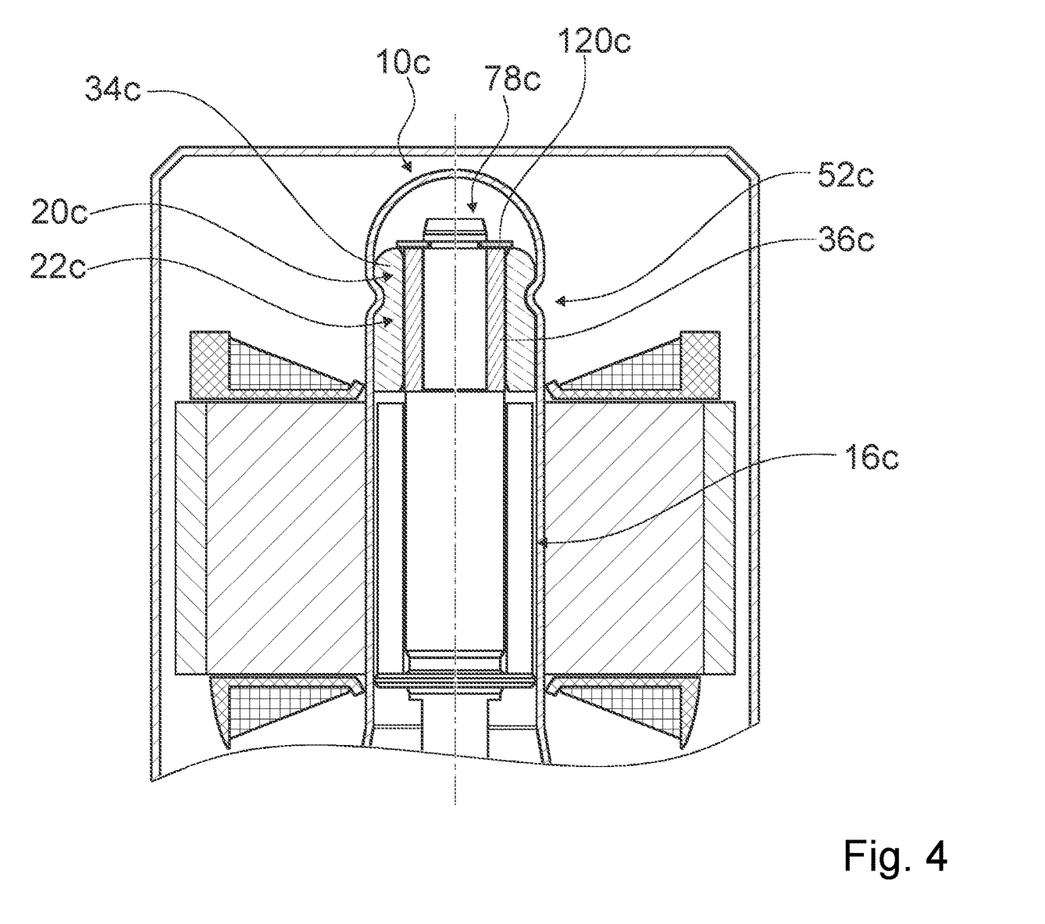

In FIGS. 3 and 4 two further exemplary embodiments of the invention are shown. The following description and the drawings are essentially limited to the differences between the exemplary embodiments, wherein regarding identically denominated components, in particular components having the same reference numerals, the drawings and/or the description of the other exemplary embodiments, in particular of FIGS. 1 and 2, may principally be referred to. In order to distinguish between the exemplary embodiments, the letter a has been added to the reference numerals of FIGS. 1 and 2. In the exemplary embodiments of FIGS. 3 and 4 the letter a has been substituted by the letters b and c.

FIG. 3 shows an alternative rotor device 52b comprising a rotor assembly group 16b, which is fixated in an interior 78b of a hollow body 10b, with an alternative support element 20b. The support element 20b is embodied as a two-row tapered roller bearing.

FIG. 4 shows a further alternative rotor device 52c comprising a rotor assembly group 16c, which is fixated in an interior 78c of a hollow body 10c, with a further alternative support element 20c. The support element 20c is embodied as a rotational slide bearing. The support element 20c comprises a securing ring 120c. The securing ring 120c is configured for an axial fixation of the support element 20c in the rotor assembly group 16c.

The rotor assembly group 16c comprises a fixation element 22c. The fixation element 22c is at least configured for a fixation of the rotor assembly group 16c within the hollow body 10c. The fixation element 22c is configured for a rotationally fixed and translationally fixed fixation of the rotor assembly group 16c in the interior 78c of the hollow body 10c. The support element 20c comprises an inner ring 36c and an outer ring 34c. The outer ring 34c is implemented integrally with the fixation element 22c. The rotor assembly group 16c is implemented so as to be free of a bearing carrier realized separately from the support element 20c.

REFERENCE NUMERALS 10 hollow body
12 pressure pipe
14 valve
16 rotor assembly group
18 rotor element
20 support element
22 fixation element
24 distance
26 diameter
28 surface
30 deepening
32 output side
34 outer ring
36 inner ring
38 output
40 side
42 bearing carrier
44 axial direction
46 recess
48 end region
50 assembly step
52 rotor device
54 stator
56 rotor
58 assembly step
60 further assembly step
62 additional further assembly step
64 rotation axis
66 valve blocking body
68 fluid duct
70 valve seat
72 spindle drive
74 electromagnetic stepper motor
76 coil winding
78 interior
80 wall
82 calotte shape
84 housing
86 rotor shaft
88 permanent magnet
90 ball
92 connection nipple
94 recess
96 abutment edge
98 bearing seat
100 shoulder
108 magnet core
110 reference marking
112 rotor space
114 stator space
116 first sub-step
118 second sub-step
120 securing ring

The invention claimed is:

1. A rotor device, with at least one hollow body which is closed in one of its axial end regions and with at least one rotor assembly group that is fixated in the hollow body, the rotor assembly group comprising
at least one rotor element, which is at least configured to convert a magnetic field change into a rotational movement of the rotor element,
a support element, which is at least configured for a rotational support of the rotor element, and
at least one fixation element, which is at least configured for a fixation of the rotor assembly group within the hollow body,
wherein the support element is arranged in the hollow body via a non-destructively inseparable connection of the support element and the rotor element with one another and via a non-destructively inseparable connection of the support element and the fixation element with one another, such that axial forces pulling at least towards the rotor element and/or axial forces pulling and pressing the support element along at least two opposing directions are transmittable via the support element,
wherein the support element is arranged on a side of the rotor element that faces away from an output of the rotor assembly group, and
wherein an output side of the rotor assembly group is free of support elements capable of transmitting axial forces.

2. The rotor device according to claim 1, wherein a radial distance from a rotation surface described by the rotor element in a 360-degree rotation to the hollow body is maximally 4.5% of the maximum diameter of the rotation surface and/or is maximally 0.3 mm.

3. The rotor device according to claim 1, wherein on at least one surface, which is situated on an outer side in a radial direction, the fixation element has at least one deepening, which is configured to enable the fixation of the rotor assembly group in the hollow body by means of an engagement at least of a portion of the hollow body into the deepening.

4. The rotor device according to claim 3, wherein the deepening in the fixation element is formed as a groove.

5. The rotor device according to claim 1, wherein the fixation element is introduced in the hollow body via a transition fit.

6. The rotor device according to claim 1, wherein the support element is implemented as a ball bearing, as a two-row tapered roller bearing and/or as a rotational slide bearing.

7. The rotor device according to claim 1, wherein the support element comprises an outer ring and an inner ring, the inner ring being at least configured for receiving axial forces from the rotor element and the outer ring being at least configured for transmitting the axial forces received by the inner ring to the fixation element and/or to the hollow body.

8. The rotor device according to claim 1, wherein the support element comprises an outer ring, which is implemented integrally with the fixation element.

9. The rotor device according to claim 1, wherein the fixation element is embodied as a bearing carrier.

10. The rotor device according to claim 9, wherein the bearing carrier comprises a continuous recess in a direction extending parallel to an axial direction of the rotor element.

11. The rotor device according to claim 1, wherein in at least one end region of the hollow body, the hollow body is implemented so as to be calotte-shaped, and/or at least the end region of the hollow body is produced via deep drawing.

12. The rotor device according to claim 1, wherein the rotor device is a stepper motor rotor device.

13. The rotor device according to claim 1, wherein the hollow body is implemented as a pressure pipe of a valve.

14. An electromagnetically controlled valve with a rotor device according to claim 1.

15. The valve according to claim 14, further comprising a stator, which is pressure-tightly and/or fluid-tightly separated from the rotor assembly group that can be flowed around by a fluid and that at least partially implements a rotor interacting with the stator.

16. A method for assembling the rotor device device, in particular according to claim 1, comprising
fixedly pressing the rotor element and the fixation element with the support element outside the hollow body.

17. The method according to claim 16, wherein in at least one further assembly step the rotor assembly group is fitted and/or inserted into the hollow body with a transition fit.

18. The method according to claim 17, wherein the rotor assembly group is fixated in the hollow body at least via welding.

19. The method according to claim 17, wherein the rotor assembly group is fixated in the hollow body at least by gluing.

20. The method according to claim 17, wherein the axial forces, which during a fitting-in, during an insertion and/or during a fixation of the fixation element in the hollow body act onto the support element in a direction that is parallel to a rotation axis of the rotor element, are smaller than maximum axial forces which are to be expected in a normal operation of the rotor device and/or of the valve.

21. The method according to claim 16, wherein in at least one additional further assembly step the rotor assembly group is fixated in the hollow body at least by a forming process acting at least onto a portion of the hollow body.

* * * * *